United States Patent [19]

Baglin

[11] Patent Number: 5,087,056
[45] Date of Patent: Feb. 11, 1992

[54] STATIC SEALING SYSTEM BETWEEN TWO FLAT-FACED CASINGS

[75] Inventor: Richard Baglin, Rueil-Malmaison, France

[73] Assignee: Societe Jaeger, Levallois-Perret, France

[21] Appl. No.: 547,080

[22] Filed: Jul. 5, 1990

[30] Foreign Application Priority Data

Jul. 6, 1989 [FR] France ............... 89 09124

[51] Int. Cl.⁵ ............................. F16J 15/00
[52] U.S. Cl. ........................ 277/180; 277/178; 277/235 B
[58] Field of Search ............ 277/160, 166, 167, 168, 277/178, 180, 203, 204, 177, 235 B, 228, 229; 285/363, 368, 405, 412, 336, 349, 910, 918

[56] References Cited

U.S. PATENT DOCUMENTS

| | | | |
|---|---|---|---|
| 3,191,949 | 6/1965 | Lansky et al. | 277/168 |
| 3,480,301 | 11/1969 | Kroening | 277/180 |
| 3,819,211 | 6/1974 | Knox | 285/336 |
| 3,831,953 | 8/1974 | Leibfritz et al. | 277/180 |
| 3,913,927 | 10/1975 | Gordon | |
| 4,094,520 | 6/1978 | Ng et al. | 277/166 |
| 4,398,696 | 8/1983 | Szilagyi et al. | 277/166 |
| 4,516,784 | 5/1985 | Merz | 277/180 |
| 4,597,583 | 7/1986 | Inciong et al. | 277/166 |
| 4,768,684 | 9/1988 | Dugge | 277/180 |
| 4,830,182 | 5/1989 | Nakazato et al. | 277/168 |

FOREIGN PATENT DOCUMENTS 2069668 11/1970 France .
697774 11/1979 U.S.S.R. .

Primary Examiner—Allan N. Shoap
Assistant Examiner—Daniel G. DePumpo
Attorney, Agent, or Firm—Lowe, Price, LeBlanc & Becker

[57] ABSTRACT

A static sealing system between two flat-faced casings is disclosed, in which a semi-plastic synthetic material seal (3) is housed in a groove (4) formed in the flat face of one of the casings and passing in the vicinity of the points (5) at which the casings (1, 2) are fixed together. The groove (4) and the seal (3) have respective variable cross-sections which vary as functions of their position with respect to fixing means (5) used to fix the casings together.

8 Claims, 2 Drawing Sheets

STATIC SEALING SYSTEM BETWEEN TWO FLAT-FACED CASINGS

FIELD OF THE INVENTION

This invention relates to a static sealing system for use between two flat-faced casings, and more particularly to such a system using a system in which a groove is formed in one of the casings and both the groove and the seal therein have cross-sections varying with position.

BACKGROUND OF THE PRIOR ART

Sealing between two flat-faced casings is very often provided by the combined use of a flat semi-plastic synthetic material seal (stamped gasket or slow setting adhesive) and clamping, or fixing means generally formed of a number of screws (or stud bolts and nuts). In the general case, which interests us here, the elastomer material seal, of an O-seal type for example, is housed in a groove formed in the flat face of one of the casings, in contact with the flat face of the other casing. The constant cross-sections of the groove and of the seal are of course determined so that, after clamping of the fixing means, a portion of the seal remains projecting from the face of the casing in which the groove is formed and remains in contact with the face of the opposite casing.

This system generally gives satisfaction when the casings are made from metal, particularly in the case of casings for cooling water pumps for motor vehicles. However, when the operating temperatures are increased, this solution becomes precarious because of the relative expansion and the lesser degree of clamping in the portions situated between the fixing screws. It then frequently happens that leaks appear precisely in these portions. This defect is further accentuated when one of the casings is made from a plastic, thermoplastic or heat hardenable material, for hot flowing of these materials is greater than for metals.

Furthermore, under stress, an elastomer tends to free itself from this stress by flowing, i.e. by a reduction of thickness, this thickness tending towards a limit value representing what is called remanence. To take this reduction into account, which is a certain percentage of the initial thickness, it is necessary, all other things being equal, to give to the seal the greatest possible thickness so as to keep maximum clamping. This requirement is felt all the more so since loosening or gaping may occur between the fixing points.

But the thickness of the seal is limited by the very arrangement of the means fixing the casings together. This arrangement, which aims at reducing as much as possible the risks of gaping, leads, in the vicinity of these fixing means, to leaving very often, for the groove housing the seal, only a fairly small space, so fairly small groove width, and consequently a limited seal thickness.

It can be seen, for the above mentioned reasons, that it is then the quality of sealing itself which is in question.

To overcome these drawbacks partially, the documents SU-A-697 774 and U.S. Pat. No. 3,913,927 propose seals with evolutive cross-section. However, with such an approach, control of the compression of the seal is imperfect to the extent that it depends mainly on the deformation of the parts between which the seal is located.

SUMMARY OF THE DISCLOSURE

The object of the present invention is to overcome these drawbacks and for this it provides a static sealing system between two flat-faced casings, in which a semi-plastic synthetic material seal is housed in a groove formed in the flat face of one of the casings and passing in the vicinity of the points at which the casings are fixed together, the seal having a varying cross-section depending on its position with respect to said fixing means, characterized by the fact that said groove has a varying cross-section as a function of its position with respect to said fixing means.

In its preferred embodiment, the groove and seal both vary progressively from a minimum value corresponding to the available space in the vicinity of the fixing points to a maximum value between these points, which may be about ten times the minimum value.

Advantageously, the dimensional variation of said groove and said seal is such that the linear compression rate remains constant.

Again advantageously, the value of the linear compression rate is between 10 and 15%.

The structure of the system of the invention which leads to giving the seal the greatest possible thickness at all points of its periphery, counterbalances the effect of remanence in the gaping zones of the contacting surfaces and so ensures the maintenance of sufficient clamping and so of perfect sealing.

BRIEF DESCRIPTION OF THE DRAWINGS

By way of example, one embodiment of the sealing system of the invention has been shown in the accompanying drawings, in which.

DETAILED DESCRIPTION OF THE PREFERRED EMBODIMENTS

Figure 2:
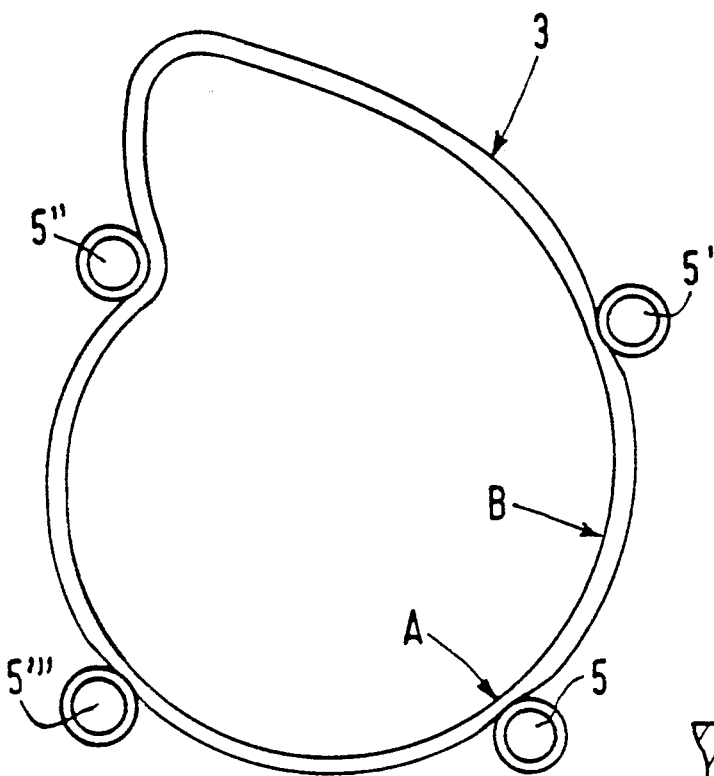
FIG. 2 is a flat view of the seal.

In the example shown in the drawings, the sealing system of the invention is applied in contact with the flat surfaces of the two casings 1 and 2 of a cooling water pump for a motor vehicle.

Sealing is provided by a seal 3 made from rubber or another elastomer material, which here has an O-seal shape. It is housed in a groove 4 formed in the surface of the casing 1 of the pump.

The casings are clamped together by stud bolts and nuts 5, 5', 5'', 5'''.

Figure 3:
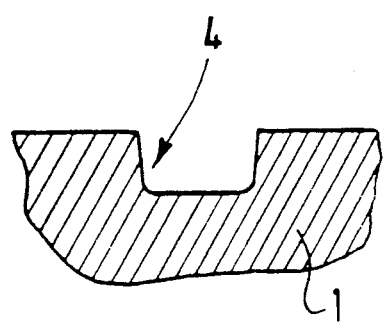
FIG. 3 is a cross-sectional view, on a larger scale, of the casing in which the groove is formed, in said zone A of the seal, of minimum thickness.
Figure 1:
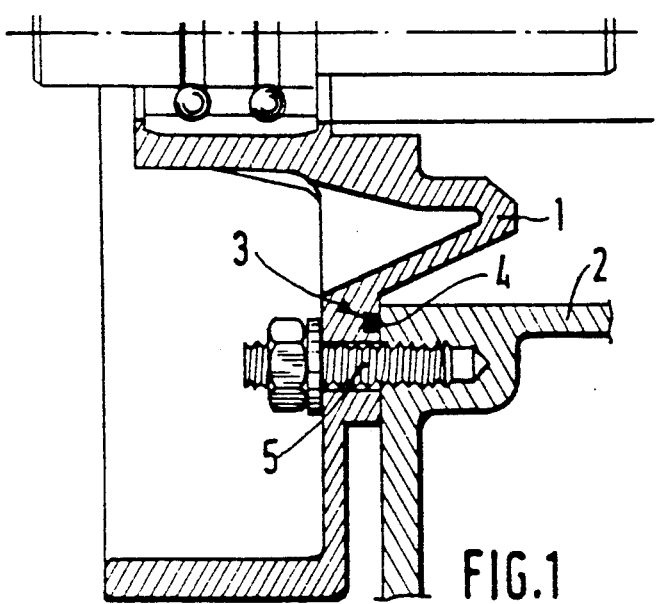
FIG. 1 is a half view in cross-section of two casings, limited to a contact zone.

As can be seen in FIG. 1, the space available for groove 4 is very limited in the vicinity of stud bolt 5, at A for example, and it will be of small width (cf. FIG. 3), for example 1.5 mm and 1.2 mm deep. Seal 3 will then have at A the minimum thickness, namely, in this example, a diameter of 1.5 nun.

Figure 4:
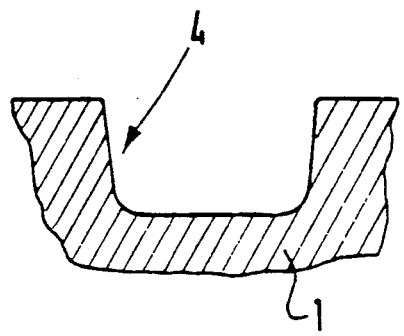
FIG. 4 is a view similar to FIG. 3, in zone B of the seal, of maximum thickness.

On the other hand, between the fixing points, for example at B between bolts 5 and 5', groove 4 may have a larger dimension (FIG. 4) for example 5 mm in width and 4.5 mm in depth, and the seal will have a diameter of 5 mm.

Connection between the maximum (B) and minimum (A) seal zones will of course be made progressively.

It has been assumed up to now that the seal was an O-seal, but it could have any other shape, without however being too flat so as not to require positioning which is too difficult.

The dimensional variation of the groove and of the seal may occur in both directions, transversely and/or longitudinally, considering that the linear compression rate of the seal must as a general rule remain constant.

Figure 5A:
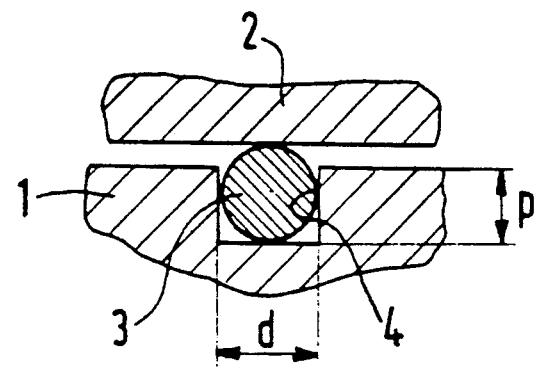
FIGS. 5a and 5b are cross-sectional views in zone A and zone B respectively, of two casings of the groove and of the seal in one embodiment.
Figure 5B:
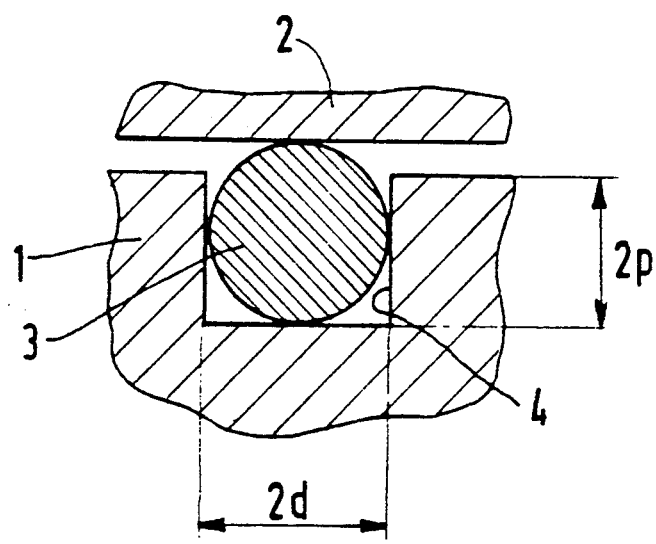

By way of example, FIGS. 5a and 5b show two cross-sections of groove 4 and seal 3 at points A and B respectively.

As shown in FIG. 5a, at A, close to the fixing point 5, groove 4 has here a rectangular cross-section of depth p and width d. Seal 3 has, at point A, a circular cross-section of diameter d, before clamping. After clamping of casing 1 against casing 2, the relative linear compression rate of seal 3 at point A is:

$$c = (d-p)/p$$

As shown in FIG. 5b, at B, distant from the fixing points 5 and 5', groove 4 has a rectangular cross-section of depth 2p and width 2d, whereas seal 3, at point B, has a circular cross-section of diameter 2d before clamping. After clamping, the relative linear compression rate is:

$$(2d-2p)/2p = (d-p)/p = C$$

Linear compression of the seal is thus kept constant all along the seal, since, for the intermediate positions at points such as A and B, a diameter kd for seal 3 may be provided, as well as a width kd and a depth kp for groove 4, which leads to the constant rate:

$$(kd-kp)/kp = (d-p)/p = C$$

The relative linear compression rate is advantageously chosen equal to 10 to 15%.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

I claim:

1. A static sealing system suitable for sealing between two generally flat-faced casings, in which a semi-plastic synthetic material seal is housed in a groove formed in the flat face of only one of the casings and is disposed in the vicinity of fixing points at which the casings are fixed together by fixing means, wherein the groove and the seal each have a variable cross-section with respect to the radial thickness of the seal, each said cross section respectively varying as a function of position with respect to said fixing points.

2. The sealing system according to claim 1, wherein: said respective cross-sections of the seal and the groove vary progressively between a minimum value in the vicinity of the fixing points and a maximum value in a zone between said fixing points.

3. The sealing system according to claim 1, wherein: the dimensional variations of said groove and of said seal are such that a linear compression rate of the seal remains constant.

4. The sealing system according to claim 3, wherein: the value of the linear compression rate is between 10% and 15%.

5. The sealing system according to claim 1, wherein: the seal has an initially circular cross-section.

6. The sealing system according to claim 1, wherein: a transverse dimension of the groove equals a corresponding initial transverse dimension of the seal at a corresponding location, and a depth of the groove at said corresponding location is less than the transverse dimension of said groove.

7. The sealing system according to claim 1, wherein: the groove has a rectangular cross-section of depth "p" and width "d" and the seal has an initial circular cross-section of diameter "d", and wherein a relative linear compression rate is defined as $c = (d-p)/p$, and the value of c ranges from 0.10 to 0.15.

8. The sealing system according to claim 7, wherein: the dimension of the groove and the seal vary in such a manner that c is a constant at all seal locations.

* * * * *